United States Patent
Takahara et al.

(10) Patent No.: US 8,705,981 B2
(45) Date of Patent: Apr. 22, 2014

(54) DRIVER CIRCUIT OF OPTICAL MODULATOR

(75) Inventors: Tomoo Takahara, Kawasaki (JP);
Takeshi Hoshida, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1429 days.

(21) Appl. No.: 12/216,270

(22) Filed: Jul. 2, 2008

(65) Prior Publication Data
US 2008/0297270 A1  Dec. 4, 2008

Related U.S. Application Data

(63) Continuation of application No. PCT/JP2006/301892, filed on Feb. 3, 2006.

(51) Int. Cl.
*H04B 10/548*  (2013.01)

(52) U.S. Cl.
USPC .......................................................... 398/188

(58) Field of Classification Search
USPC .......................................................... 398/188
See application file for complete search history.

(56) References Cited

U.S. PATENT DOCUMENTS

| | | | | |
|---|---|---|---|---|
| 6,407,845 | B2 * | 6/2002 | Nakamoto | 359/239 |
| 7,885,550 | B2 * | 2/2011 | Oberland | 398/190 |
| 2002/0005975 | A1 | 1/2002 | Nakamoto | |
| 2007/0047969 | A1 | 3/2007 | Nakashima et al. | |

FOREIGN PATENT DOCUMENTS

| | | |
|---|---|---|
| JP | 09-214470 | 8/1997 |
| JP | 2001-147408 | 5/2001 |
| JP | 2002-23124 | 1/2002 |
| JP | 2004-516743 | 6/2004 |
| JP | 2004-252386 | 9/2004 |
| JP | 2007-67902 | 3/2007 |
| WO | WO 02-51041 A2 | 6/2002 |
| WO | WO 02-51041 A3 | 6/2002 |

* cited by examiner

*Primary Examiner* — Shi K Li
(74) *Attorney, Agent, or Firm* — Staas & Halsey LLP

(57) ABSTRACT

A drive signal generation unit generates first and second drive signals for driving first and second phase modulators of a DQPSK optical modulator. First and second regeneration circuits regenerate the first and second drive signals with respect to clock signals. The first and second phase modulators are driven by the regenerated first and second drive signals. The amplitude of the first drive signal is adjusted by a first attenuator. The clock signal for the second regeneration circuit is applied after attenuated by a second attenuator. The delay time caused by the first attenuator is the same as the delay time caused by the second attenuator.

8 Claims, 19 Drawing Sheets

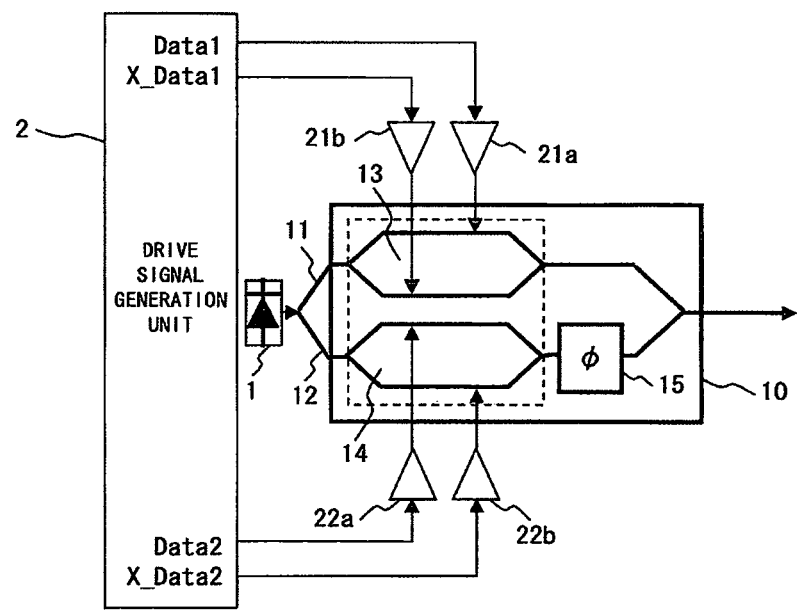
F I G. 1

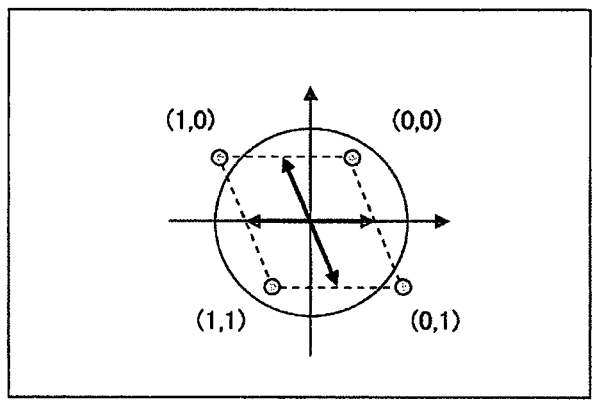
F I G. 3

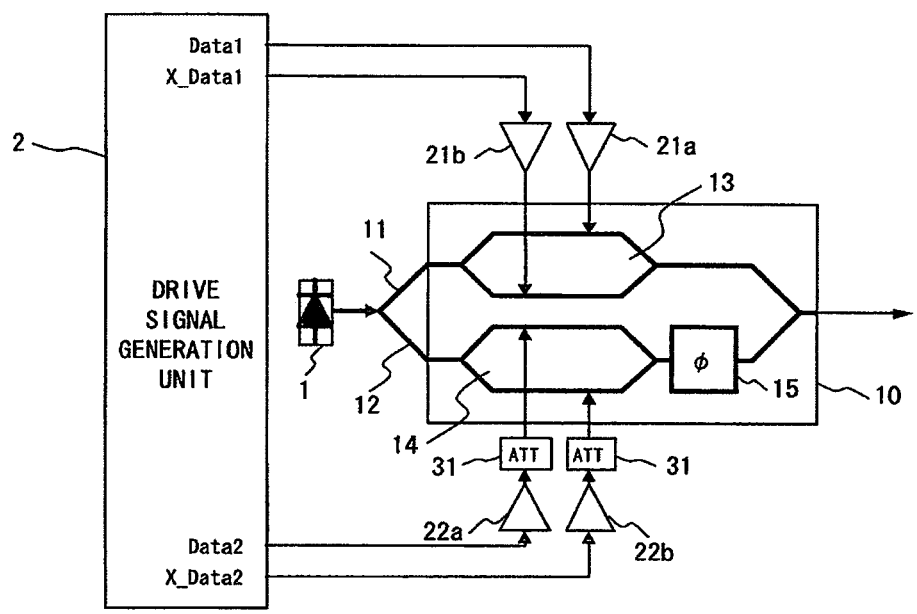
F I G. 5

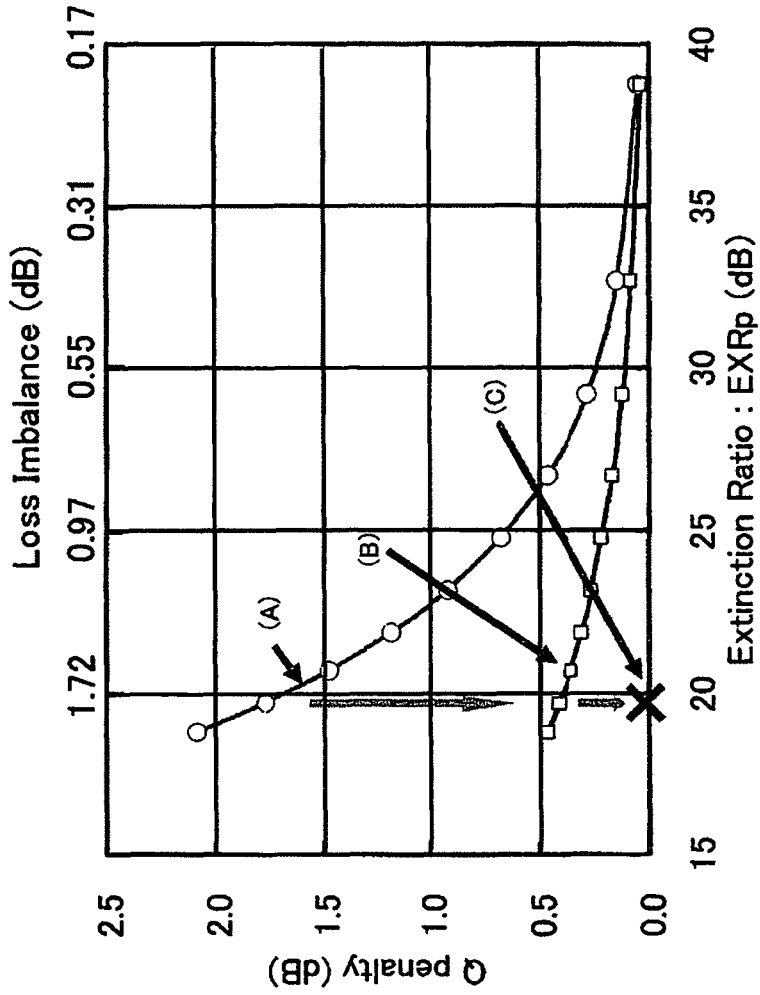
F I G. 9

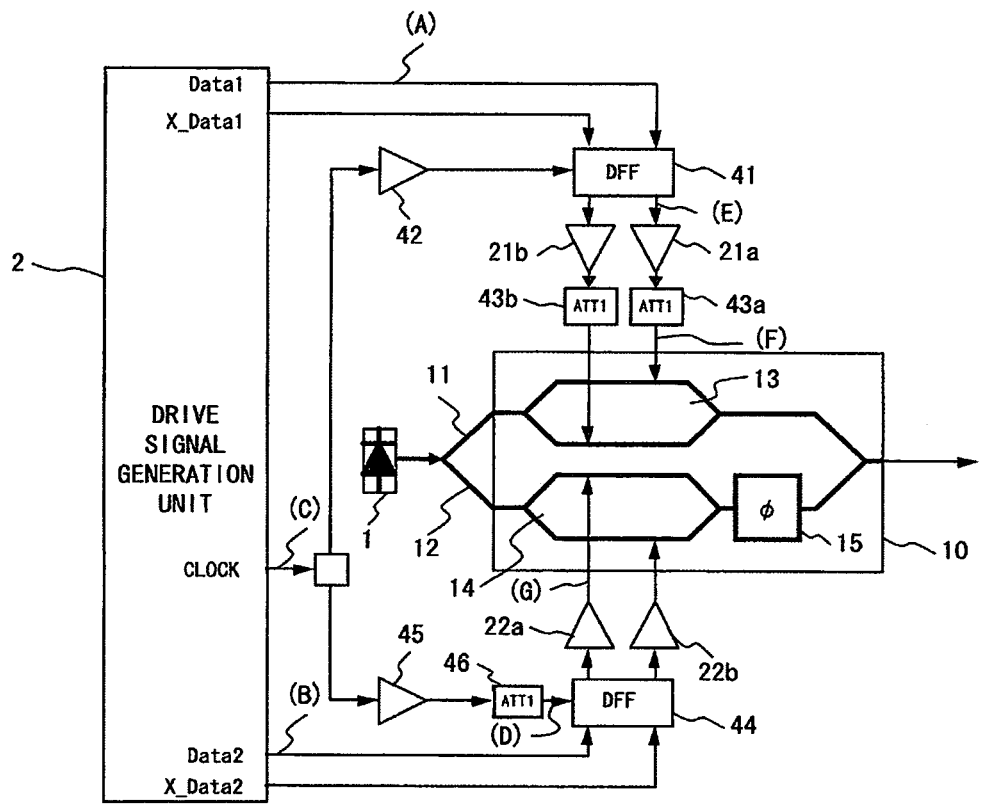
F I G. 10

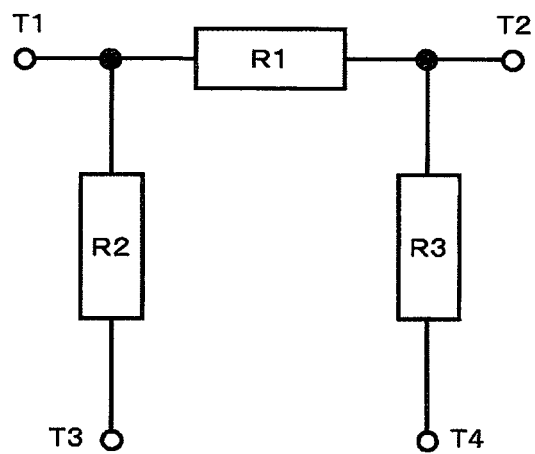
F I G. 1 1

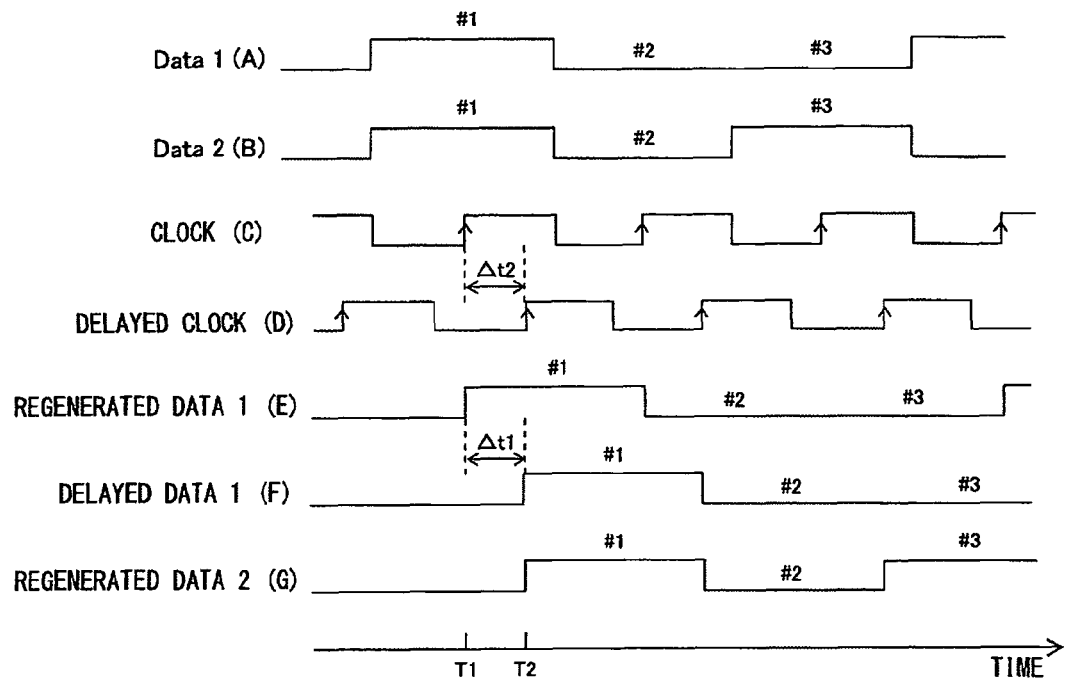
F I G. 1 2

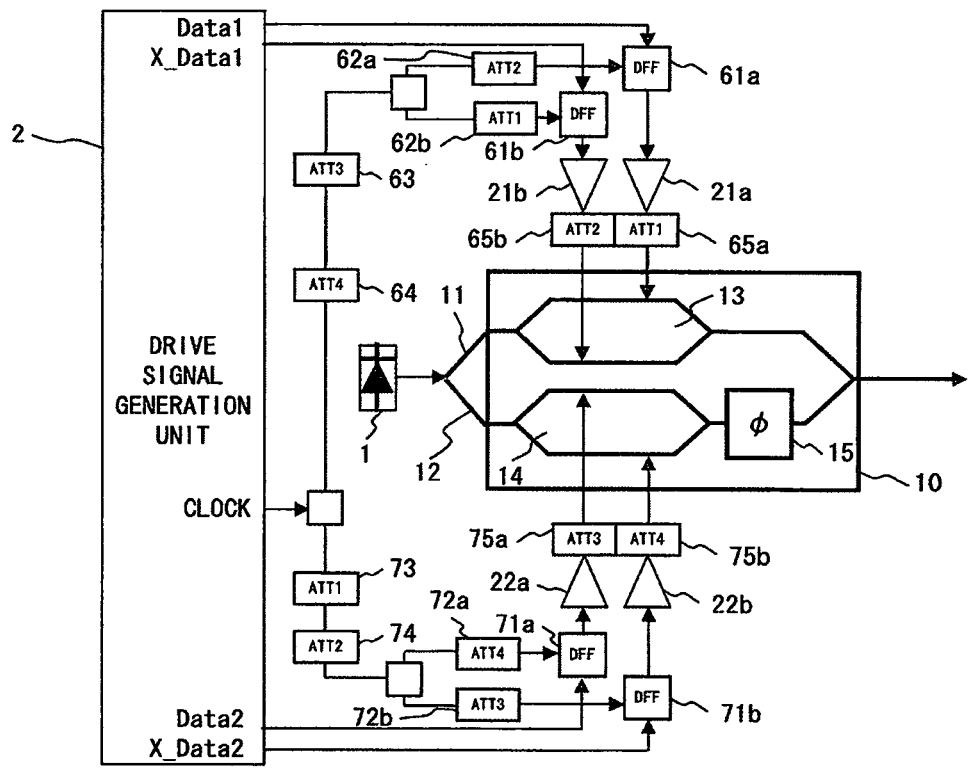
F I G. 16

DRIVER CIRCUIT OF OPTICAL MODULATOR

CROSS REFERENCE TO RELATED APPLICATION

This application is a continuation of the PCT application PCT/JP2006/301892, which was filed on Feb. 3, 2006.

BACKGROUND OF THE INVENTION

1. Field of the Invention

The present invention relates to a drive circuit for driving an optical modulator and more particularly to a drive circuit for driving a DQPSK optical modulator.

2. Description of the Related Art

Phase modulation is widely put in practical use as one technology for transmitting signals in an optical transmission system. In phase modulation, data is transmitted by controlling the phase of a carrier wave according to transmission data. For example, in quadrature phase shift keying (QPSK) modulation "θ", "θ+π/2" "θ+π" and "θ+3π/2" are assigned to symbols "00", "10", "11" and "01" each composed of two-bit data, respectively. In this case, "θ" is an arbitrary phase. The receiver recovers the transmission data by detecting the phase of the reception signal.

Differential QPSK (DQPSK) is known as a technology for fairly easily realizing a QPSK receiver. In DQPSK modulation, corresponding phases (0, π/2, π and 3π/2) are assigned to differentials between two continuous symbols. Therefore, the receiver can recover transmission data by detecting the phase difference between two continuous symbols.

FIG. 1 shows the configuration of a general DQPSK transmitter. Here only components needed to explain its basic operation are shown.

A DQPSK signal modulator 10 is a Mach-Zehnder modulator and continuous wave (CW) light generated by an optical source 1 is applied to it. The CW light is split by an optical splitter and guided to a pair of arms 11 and 12. The arm (I arm) 11 is provided with a phase modulator 13 and the arm (Q arm) 12 is provided with a phase modulator 14 and a phase shifter 15. The phase modulators 13 and 14 are Mach-Zehnder modulators. The phase shifter 15 gives phase difference π/2 (π/2+2nπ (n is an integer)) between the arms 11 and 12.

A drive signal generation unit 2 generates a pair of drive signals Data 1 and X_Data 1, and a pair of drive signals Data 2 and X_Data 2 by encoding the transmission data using a DQPSK precoder. The drive signals X_Data 1 and X_Data 2 are the inverted signals of the Data 1 and Data 2, respectively. The drive signals Data 1 and X_Data 1 are applied to the phase modulator 13 as differential signals after being amplified by driver elements 21a and 21b. Similarly, the drive signals Data 2 and X_Data 2 are applied to the phase modulator 14 as differential signals after being amplified by driver elements 22a and 22b. Specifically, the phase modulators 13 and 14 are driven by a pair of the drive signals Data 1 and X_Data 1 and a pair of the drive signals Data 2 and X_Data 2, respectively. Then, by combining a pair of optical signals outputted from the phase modulator 13 and 14, DQPSK signals are generated.

FIG. 2 explains the operation of the DQPSK transmitter. In this case it is assumed that the phase of CW light is zero.

The phase of an optical signal outputted from the phase modulator 13 is controlled to "0" or "π" according to the drive signals Data 1 and X_Data 1. The arm 12 is provided with the phase shifter 15 with the amount of phase shift π/2. Therefore, the phase of an optical signal outputted from the phase modulator 14 is controlled to "π/2" or "3π/2" according to the drive signals Data 2 and X_Data 2. Thus, "π/4", "3π/4", "5π/4" or "7π/4" is assigned to each symbol (00, 10, 11 or 01) having two-bit information. Then, the receiver recovers the transmission data by detecting a phase difference between two continuous symbols.

For example, Patent Document 1 (Japanese Patent Publication No. 2004-516743) discloses in detail the configuration and operation of a DQPSK optical transmitter.

When the intensity of the optical signals on I and Q arms are imbalanced in the DQPSK transmitter with the above-described configuration, as shown in FIG. 3, the phase of a DQPSK optical signal obtained by combining them becomes inappropriate. Then, a possibility of wrongly detecting the phase of the optical signal in the receiver becomes high and channel quality deteriorates. One factor of this problem is the manufacturing variability among modulators (modulators 13 and 14 in FIG. 1)

In order to improve channel quality the above-described problem must be solved. However, DQPSK is still a technology under development and there are few specific proposals.

SUMMARY OF THE INVENTION

It is an object of the present invention to improve the channel quality using DQPSK or QPSK.

The driver circuit of the present invention drives a phase modulator to generate a phase modulated optical signal by combining a first optical signal obtained by a first phase modulation element and a second optical signal obtained by a second phase modulation element, using a first drive signal for driving the first phase modulation element and a second drive signal for driving the second phase modulation element. This driver circuit comprises a first regeneration circuit regenerating the first drive signal using a clock signal, an attenuator attenuating the first drive signal regenerated by the first regeneration circuit, a delay element delaying the clock signal to compensate for the delay of the first drive signal caused in the attenuator, and a second regeneration circuit for regenerating the second drive signal using the clock signal delayed by the delay element.

BRIEF DESCRIPTION OF THE DRAWINGS

FIG. 1 shows the configuration of a general DQPSK transmitter.

FIG. 3 explains the problem of the prior art.

FIG. 5 shows an example of the driver circuit with a function to adjust drive signals (No. 2).

FIG. 9 shows one example of the simulation result indicating the influence of the error in amplitude of a drive signal.

FIG. 10 shows an optical transmitter including the driver circuit of the first embodiment.

FIG. 11 shows an example of the attenuator.

FIG. 12 is a timing chart explaining the operation of the driver circuit of the first embodiment.

FIG. 16 shows an optical transmitter including the driver circuit of the third embodiment.

DESCRIPTION OF THE EMBODIMENTS

According to one aspect of the present invention, signals are avoided from deteriorating due to the imbalance in amplitude between the first and second drive signals by appropriately selecting the amount of attenuation of the attenuator.

The first drive signal is delayed by the attenuator. The clock signal applied to the second regeneration circuit to regenerate the second drive signal is delayed by the delay element. Here, the delay by the delay element compensates for the delay caused by the attenuator. Therefore, the timings of the first and second drive signals are matched.

In this way, according to the configuration, since the amplitude and timing between the drive signals are adjusted, the channel quality using the optical modulator is improved.

The embodiments of the present invention are described below with reference to the drawings. In the following description, the DQPSK optical transmitter described with reference FIG. 1 is picked up as one example of the optical transmitter. However, the present invention is not limited to DQPSK and it is also applicable to QPSK.

As one measure to improve channel quality (especially to compensate for the characteristic variability of the phase modulators 13 and 14) in the DQPSK optical transmitter shown in FIG. 1, a method of adjusting the amplitude of drive signals for each DQPSK optical transmitter is considered. The following three methods are considered as simple method for adjusting drive signals.

Figure 2:
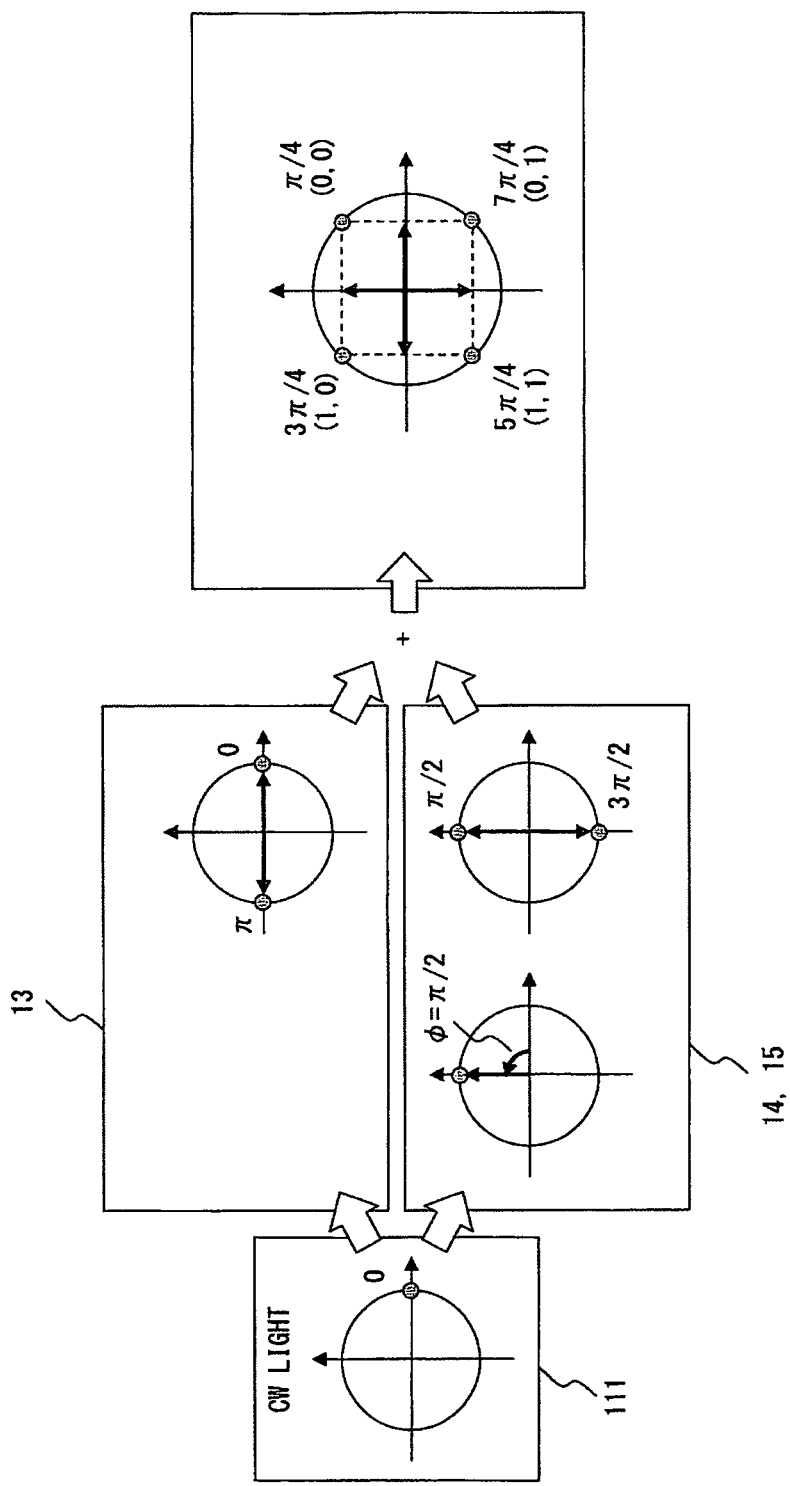
FIG. 2 explains the operation of the DQPSK transmitter.
Figure 4:
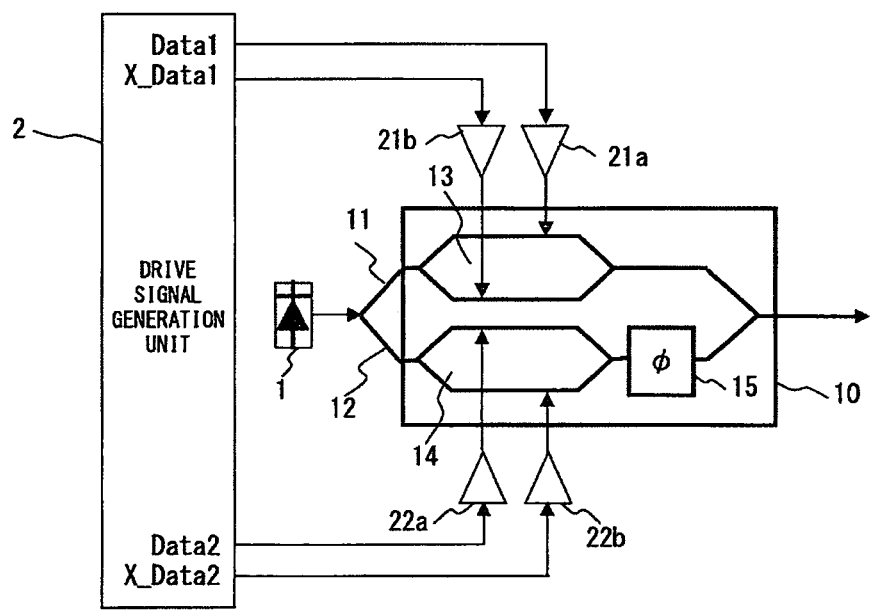
FIG. 4 shows an example of the driver circuit with a function to adjust drive signals (No. 1).

Method 1: The bias conditions of the driver element (21a or 21b) for amplifying drive signals applied to the phase modulator 13 and the bias conditions of the driver element (22a or 22b) for amplifying drive signals applied to the phase modulator 14 are individually adjusted, as shown in FIG. 4. Specifically, the gains of the driver element on the I arm and Q arm are independently controlled. According to this configuration, the amplitude of an individual drive signal can be adjusted to compensate for the characteristic difference between the phase modulators 13 and 14.

However, if the operational conditions (especially bias condition) of a driver element are different, the delay time of the driver element is also different. Therefore, there is a possibility that the timing difference between the drive signals on the I arm and Q arm (hereinafter called "skew between I/Q") may exceed its allowable range. In addition, if the operational conditions are different, the aging of a specific circuit device progresses.

Method 2: Attenuators (ATT) are provided on one of the I arm and Q arm in order to attenuate the drive signals, as shown in FIG. 5. In the example as shown in FIG. 5 attenuators 31 are provided between the driver element (22a, 22b) and the phase modulator 14. According to this configuration the amplitude of a drive signal applied to the phase modulator 14 can be adjusted in such a way that the intensity of optical signals on the I arm and Q arm may be matched. However, if the attenuator (ATT) is provided on one of the I arm and Q arm, there is a possibility that the skew between I/Q may exceed its allowable range.

Figure 6:
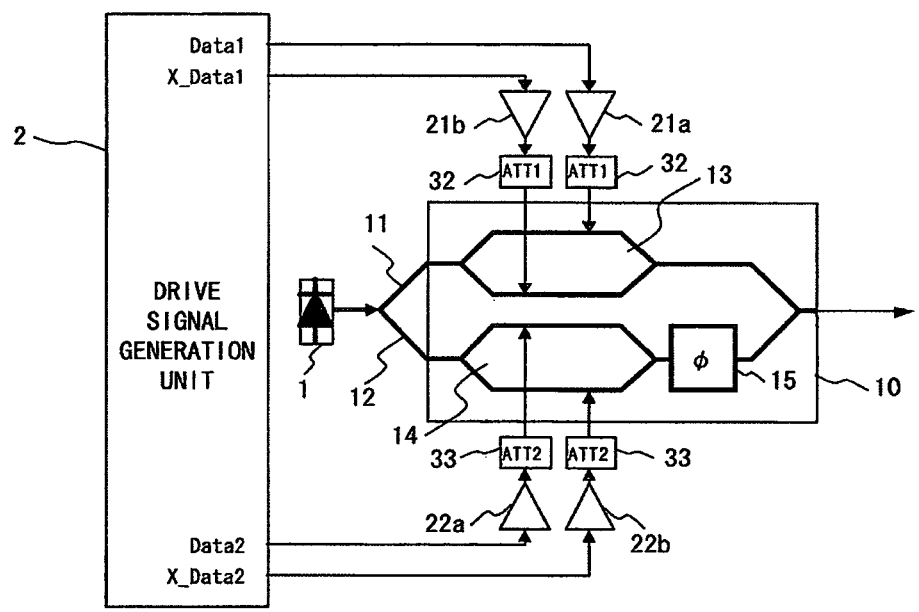
FIG. 6 shows an example of the driver circuit with a function to adjust drive signals (No. 3).

Method 3: Attenuators (ATT1 and ATT2) are provided on both of the I arm and Q arm in order to attenuate the drive signals, as shown in FIG. 6. In the example as shown in FIG. 6, attenuators 32 are provided between the driver element (21a, 21b) and the phase modulator 13, and attenuators 33 are provided between the driver element (22a, 22b) and the phase modulator 14. However, if it is necessary to make the amount of attenuation of the attenuators 32 and 33 differ from each other, it is not easy to match their delay times. Specifically, even in this configuration, there is a possibility that the skew between I/Q may exceed its allowable range.

Figure 7:
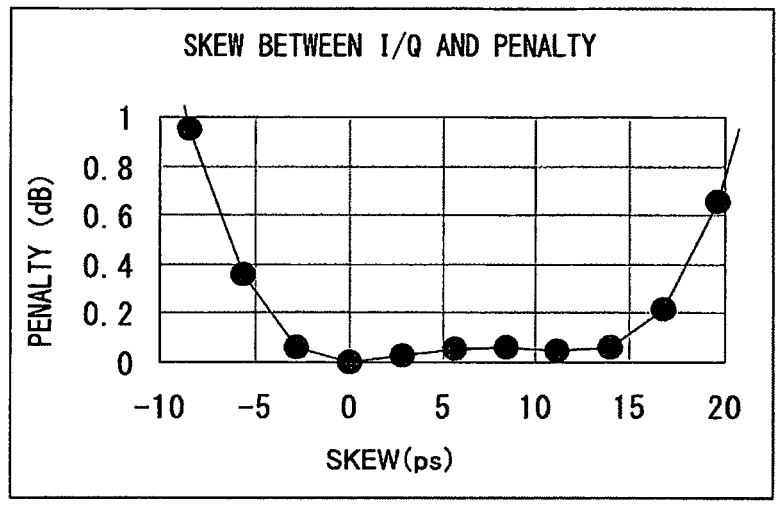
FIG. 7 shows one example of the simulation result of the relationship between a skew between I/Q and penalty.

FIG. 7 shows one example of the simulation result of the relationship between a skew between I/Q and penalty. In this simulation, the transmission data rate is 40 Gbps (20 Gbaud/sec). The allowable signal deterioration loss (that is, Q penalty) is assumed to be 0.5 dB. In that case, the skew between I/Q must be suppressed to 8 pico-seconds or less.

In the configuration shown in FIG. 6, it is assumed that the amount of attenuators 32 and 33 are, for example, 3 dB and 6 dB, respectively. In this case, if these attenuators are realized by general K connector type attenuators, a delay difference of 3 pico-seconds or more occurs between the I arm and Q arm. If the allowable skew between I/Q is 8 pico-seconds, this delay difference cannot be neglected.

Figure 8:
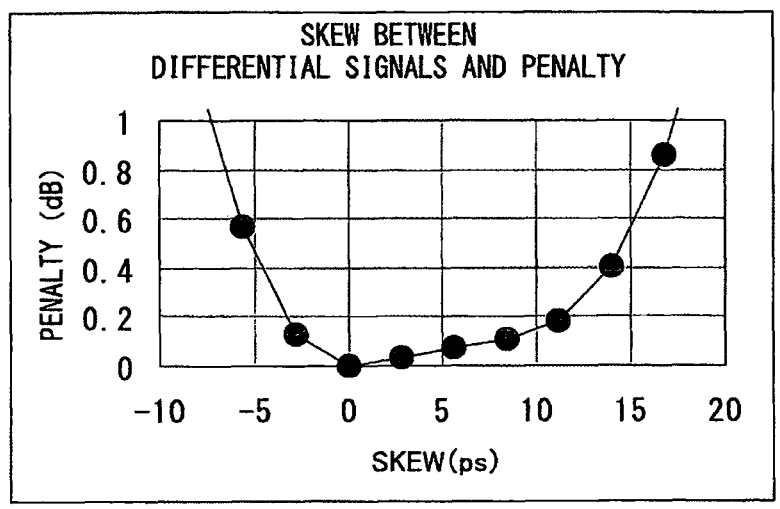
FIG. 8 shows one example of the simulation result of the relationship between a skew between differential signals and penalty.

FIG. 8 shows one example of the simulation result of the relationship between a skew between differential signals and penalty. In this case, the skew between differential signals indicates a timing difference between two drive signals constituting a differential signals (for example, drive signals Data 1 and X_Data 1 shown in FIG. 1). According to this simulation, if the allowable signal deterioration loss is 0.5 dB, the skew between differential signals must be suppressed to 5 pico-seconds or less.

FIG. 9 shows one example of the simulation result indicating the influence of the error in amplitude of a drive signal. In FIG. 9 characteristic A indicates a penalty in the case where amplitude of a drive signal is not adjusted. Characteristic B indicates a penalty in the case where the average amplitude of a pair of drive signals are adjusted. Characteristic C indicates a penalty in the case where the amplitude of each pair of drive signals is adjusted. This simulation indicates that if amplitude of a drive signal is not adjusted, penalty increases in a range where the extinction ratio of an optical modulator is low.

As discussed, in order to improve channel quality by suppressing signal deterioration, it is preferable both to appropriately adjust the amplitude of a drive signal and to appropriately adjust the timing of a drive signal. The driver circuit of the embodiment of the present invention provides the two above-described adjustment functions.

<The First Embodiment>

FIG. 10 shows an optical transmitter including the driver circuit in the first embodiment. In FIG. 10 the optical source 1, the drive signal generation unit 2, the DQPSK optical modulator 10, the driver elements 21a, 21b, 22a and 22b are already described with reference to FIG. 1. Specifically, the drive signal generation unit 2 includes an FEC encoder, a DQPSK pre-coder and generates a pair of drive signals Data 1 and x_Data 1 constituting a differential signals and a pair of drive signals Data 2 and X_Data 2 constituting a differential signals. The drive signals Data1 and X_Data 1 are fed to the phase modulator 13 and the drive signals Data 2 and X_Data 2 are fed to the phase modulator 14. Then, the DQPSK optical modulator 10 generates DQPSK optical signals modulated according to the combination of drive signals (00, 10, 11 and 10). The driver circuit of the first embodiment includes regeneration circuits 41 and 44, attenuators 43a and 43b, driver elements 21a, 21b, 22a, 22b, 42 and 45.

The regeneration circuit 41 is, for example, a D flip-flop circuit and regenerates the drive signals Data 1 and X_Data 1 at the timing of a clock signal applied via the driver element 42. Specifically, the regeneration circuit 41 operates as a retiming circuit of the drive signals Data1 and X_Data 1. The drive signals Data1 and X_Data 1 regenerated by the regeneration circuit 41 are transmitted to the attenuators 43a and 43b via the driver elements 21a and 21b, respectively. The attenuators 43a and 43b are the same devices and their amount of attenuation is "ATT1". The drive signals Data 1 and X_Data 1, whose amplitude are adjusted by the attenuators 43a and 43b, are applied to the phase modulator 13.

The regeneration circuit 44 is, for example, a D flip-flop circuit and regenerates the drive signals Data 2 and X_Data 2 at the timing of a clock signal applied via the driver element 45 and the attenuator 46. Specifically, the regeneration circuit 44 operates as a retiming circuit of the drive signals Data 2 and X_Data 2. The attenuator 46 is the same device as the attenuators 43a and 43b. Specifically, the delay time of the clock signal caused by the attenuator 46 is the same as ones of the drive signals Data 1 and X_Data 1 caused by the attenuators 43a and 43b. The drive signals Data 2 and X_Data 2 regenerated by the regeneration circuit 44 are applied to the phase modulator 14 via the driver elements 22a and 22b, respectively.

FIG. 11 shows an example of the attenuator. Each attenuator (43a, 43b or 46) is not limited, but in this embodiment, is an unbalance type attenuator, which comprises three resistor elements. Terminals T1 and T2 are input/output terminals and terminals T3 and T4 are grounded. A desired amount of attenuation can be obtained by appropriately setting the resistance of the three resistor elements R1-R3.

The driver circuit with the above-described configuration is designed in such a way as to satisfy the following conditions in a state where the attenuators are not provided. These conditions are satisfied in the second embodiment described later.

Condition 1: The propagation time of the drive signals Data 1 and X_Data 1 from the drive signal generation unit 2 to the regeneration circuit 41 is the same as that of the drive signals Data 2 and X_Data 2 from the drive signal generation unit 2 to the regeneration circuit 44.

Condition 2: The propagation time of the clock signal from the drive signal generation unit 2 to the regeneration circuit 41 is the same as that of the clock signal from the drive signal generation unit 2 to the regeneration circuit 44.

Conditions 3: The propagation time of the drive signals Data 1 and X_Data 1 from the regeneration circuit 41 to the phase modulator 13 is the same as that of the drive signals Data2 and X_Data2 from the regeneration circuit 44 to the phase modulator 14.

FIG. 12 is a timing chart explaining the operation of the driver circuit in the first embodiment. In this case an operation to adjust the timings of the drive signals Data 1 and Data 2 is shown and an operation to adjust the timings of the drive signals X_Data 1 and X_Data 2 is omitted. Since the above-described three conditions are satisfied, the delay caused in the driver element and the propagation delay caused on a signal line are neglected.

In FIG. 12 the drive signal generation unit 2 generates drive signals Data 1 (A) and Data 2 (B). In this example, symbols #1, #2 and #3 are "11", "00" and "01", respectively. The drive signal generation unit 2 also outputs a clock signal(C).

The regeneration circuit 41 regenerates the drive signal Data 1 using the rising edge of the clock signal(C). In this example, data #1 of the drive signal Data 1 is regenerated at the time T1. Thus, a drive signal Data 1(E) is obtained. Then, the drive signal Data 1(E) outputted from the regeneration circuit 41 passes through the attenuator 43a. Thus, a drive signal Data 1(F), whose amplitude is adjusted, is obtained. At this moment, a delay $\Delta t1$ occurs in the attenuator 43a.

The regeneration circuit 44 regenerates the drive signal Data 2 using the rising edge of the clock signal(D). The attenuator 46 is provided between the drive signal generation unit 2 and the regeneration circuit 44. When the clock signal passes through the attenuator 46, a delay $\Delta t2$ occurs. Therefore, the regeneration circuit 44 regenerates data #1 of the drive signal Data 2 at a time T2 after $\Delta t2$ elapses from time T1. Thus, a drive signal Data 2(G) is obtained.

In this case, the attenuators 43a and 46 are the same devices and their delay times are the same. Specifically, the delays $\Delta t1$ and $\Delta t2$ are the same. Therefore, the timing in which the drive signal Data 1(F) is applied to the phase modulator 13 and the timing in which the drive signal Data 2 (G) is applied to the phase modulator 14 are matched. Specifically, the skew between I/Q can be suppressed (or the skew between I/Q due to an attenuator does not occurs).

Since the attenuator 46 is provided in the above-described configuration, the clock signal applied to the regeneration circuit 44 is more attenuated than that applied to the regeneration circuit 41. However, the amplitude of a clock signal is not important for a regeneration circuit. Specifically, if the clock signal has enough amplitude sufficient for the regeneration circuit 44 to detect its edge, even when the clock signal is attenuated, there is no problem in the regeneration circuit 44. That is to say, delay due to attenuation of the clock signal does not occur in the regeneration circuit.

The drive signals X_Data 1 and X_Data 2 are the inverted signals of the drive signals Data 1 and Data 2, respectively. Therefore, the drive signals X_Data 1 and X_Data 2 are also applied to their corresponding phase modulators at the same timings.

In the above-described configuration, the respective amount of attenuation of the attenuators 43a and 43b are determined, for example, in such a way that the differential voltage of the drive signals applied to the phase modulator 13 and that of the drive signals applied to the phase modulator 14 may be matched (or the waveform of a DQPSK optical signal outputted from the DQPSK optical modulator 10 can be optimized). Then, the adjustment of the amplitude and timing of the drive signals can be simultaneously realized. As a result, channel quality can be improved.

In the driver circuit with the above-described configuration, a semiconductor circuit is symmetrically formed between the I arm and the Q arm. Specifically, the driver elements (21a and 21b) provided on the I arm and the driver elements (22a and 22b) provided on the Q arm are realized by the same device and operate on the same bias conditions. Therefore, a skew between I/Q due to a delay in a driver element never occurs. Only a specific device never deteriorates and high channel quality is maintained for a long time.

Furthermore, in the driver circuit with the above-described configuration, since the attenuator for adjusting the amplitude of a drive signal is a passive device, a delay deviation due to the difference in a bias condition of a semiconductor device (driver element in this case) never occurs. Therefore, both a function to appropriately adjust the amplitude of a drive signal and high skew accuracy can be realized.

Figure 13:
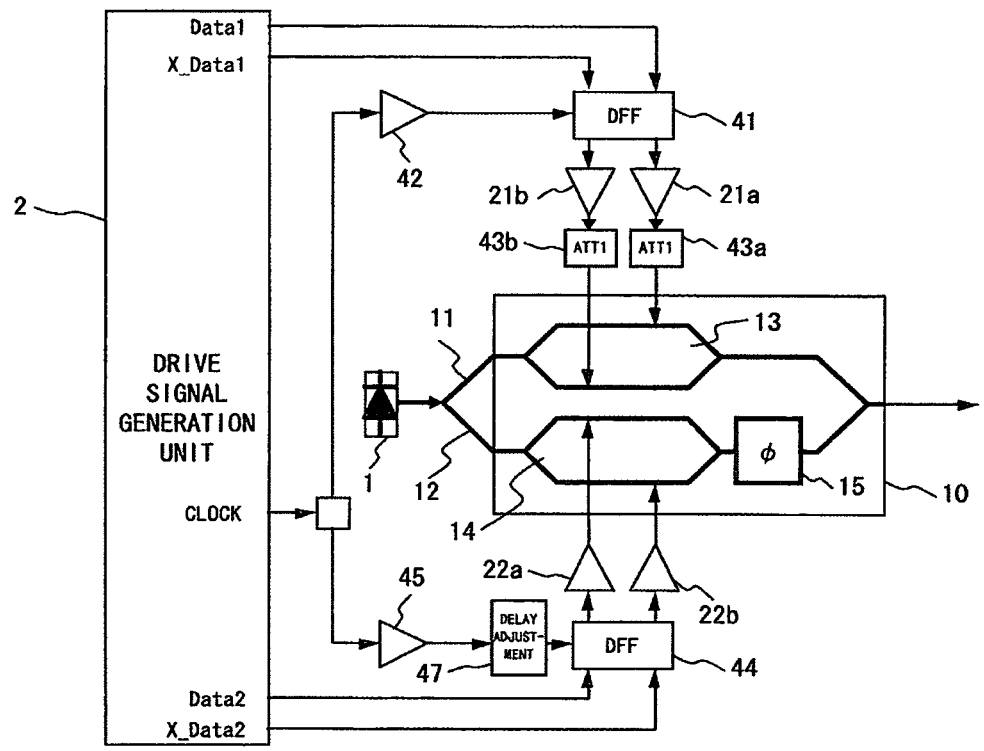
FIG. 13 shows a variation of the first embodiment.

FIG. 13 shows a variation of the first embodiment. The driver circuit shown in FIG. 13 is provided with a delay adjustment element 47 instead of the attenuator shown in FIG. 10. The delay adjustment element 47 compensates for the delay of the drive signals Data 1 and X_Data 1, caused in the attenuators 43*a* and 43*b*. Specifically, the delay time of the clock signal by the delay adjustment element 47 is the same as that of the drive signals Data 1 and X_Data 1, caused in the attenuators 43*a* and 43*b*. The delay adjustment element 47 is not especially limited, but, for example, it can be realized by a transmission line (conductor wire) with the above-described delay time. In this case, a desired delay time can be obtained by adjusting the length of the transmission line. The attenuator 46 may be considered to be one form for realizing the delay adjustment element.

<The Second Embodiment>

The driver circuit of the first embodiment adjusts the amplitude of a drive signal in one of the I arm and Q arm (I arm in the example). However, in the driver circuit in the second embodiment the amplitude of the drive signals is adjusted in both of the I arm and Q arm.

Figure 14:
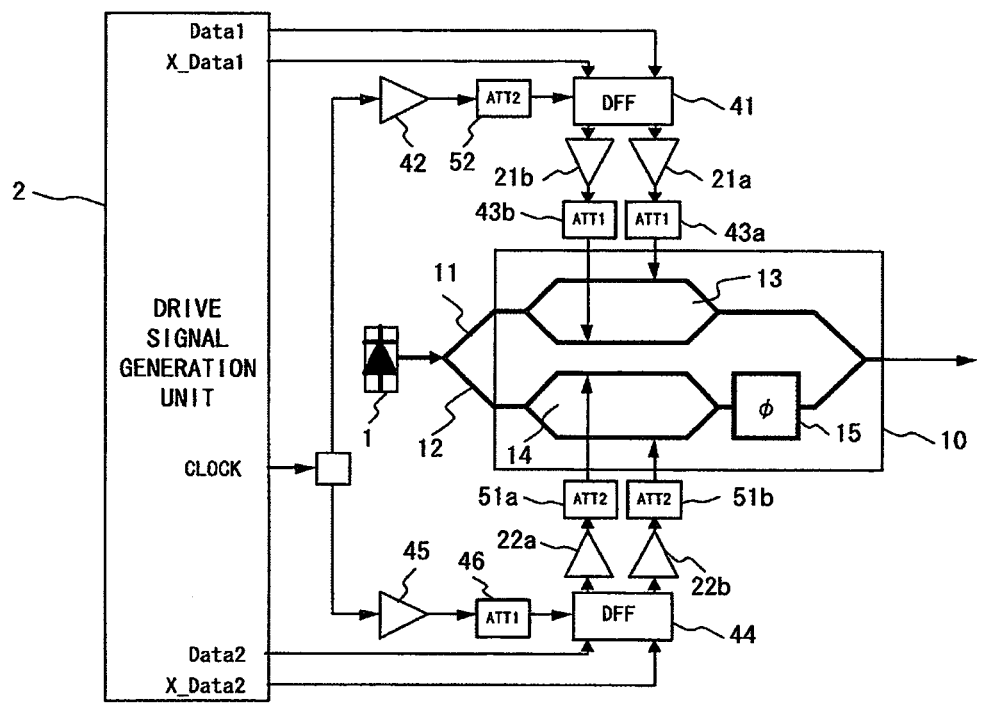
FIG. 14 shows an optical transmitter including the driver circuit of the second embodiment.

FIG. 14 shows an optical transmitter including the driver circuit of the second embodiment. In FIG. 14, the driver elements 21*a*, 21*b*, 22*a*, 22*b*, 42 and 45, the regeneration circuits 41 and 44 and the attenuators 43*a*, 43*b* and 46 are the same as the corresponding elements provided in the driver circuit of the first embodiment.

The driver circuit in the second embodiment comprises attenuators 51*a*, 51*b* and 52 in addition to the above-described configuration. The attenuators 51*a* and 51*b* are provided between the driver elements 22*a* and 22*b* and the phase modulator 14, respectively, and adjust the amplitude of the drive signals Data 2 and X_Data 2. The attenuator is provided between the driver element 42 and the regeneration circuit 41. The attenuator 52 is the same device as the attenuators 51*a* and 51*b*. Specifically, the delay time of the clock signal, caused by the attenuator 52 is the same as that of the drive signals Data 2 and X_Data 2, caused by the attenuators 51*a* and 51*b*.

In this driver circuit, the amount of attenuation of the attenuators (43*a* and 43*b*) for adjusting the amplitude of the drive signals on the I arm and that of the attenuators (51*a* and 51*b*) for adjusting the amplitude of the drive signals on the Q arm can be independently controlled. Therefore, the amplitude of the drive signals Data 1 and X_Data 1 for driving the phase modulator 13 and that of the drive signals Data 2 and X_Data 2 for driving the phase modulator 14 can be appropriately adjusted independently. The amount of attenuation of each attenuator is controlled, for example, in such a way that the differential voltage of the drive signals applied to the phase modulator 13 and that of the drive signals applied to the phase modulator 14 can be matched (or the waveform of a DQPSK optical signal outputted from the DQPSK optical modulator 10 can be optimized).

A delay caused on the I arm by the attenuators 43*a* and 43*b* is compensated for by delaying the clock signal using the attenuator 46 on the Q arm. In addition, a delay caused on the Q arm by the attenuators 51*a* and 51*b* is compensated for by delaying the clock signal using the attenuator 52 on the I arm. Therefore, a skew between I/Q is suppressed (or the skew between I/Q due to an attenuator does not occurs).

In this way, in the second embodiment, as in the first embodiment, the adjustment of the amplitude of a drive signal and the adjustment of the timing of the drive signal are simultaneously realized, and the channel quality is improved accordingly. In the second embodiment too, a semiconductor circuit is symmetrically formed between the I arm and Q arm.

Figure 15:
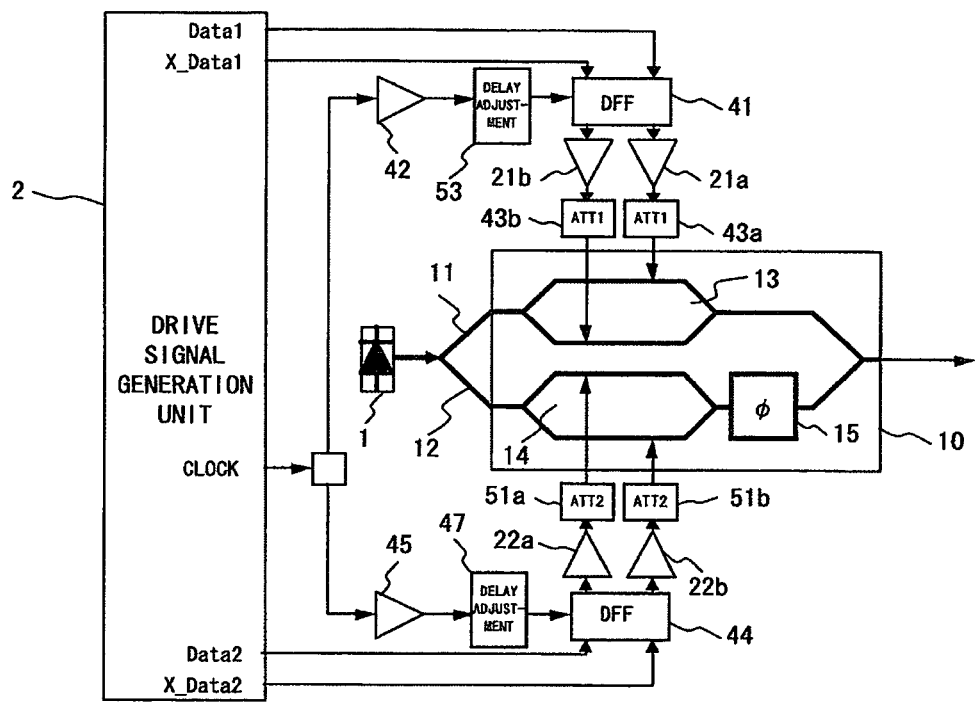
FIG. 15 shows a variation of the second embodiment.

FIG. 15 shows a variation of the second embodiment. The driver circuit shown in FIG. 15 comprises delay adjustment elements 47 and 53 instead of the attenuators 46 and 52 shown in FIG. 14. The delay adjustment element 47 compensates for the delay of the drive signals Data 1 and X_Data 1, caused in the attenuators 43*a* and 43*b*, as in the first embodiment. The delay adjustment element 53 compensates for the delay of the drive signals Data 2 and X_Data 2, caused in the attenuators 51*a* and 51*b*. The delay adjustment elements 47 and 53 can be, for example, realized by a transmission line with corresponding delay time, as in the first embodiment. In this case, desired delay time can be obtained by adjusting the length of the transmission line.

<The Third Embodiment>

The driver circuit of the first or second embodiment provides a function to adjust the amplitude of a drive signal and a function to suppress a skew between I/Q. However, the driver circuit of the third embodiment further provides a function to individually adjust the amplitude of a pair of drive signals constituting a differential signals for driving a corresponding phase modulator in addition to the above described two functions.

FIG. 16 shows an optical transmitter including the driver circuit in the third embodiment. In FIG. 16 the drive signals Data 1 and X_Data 1 are regenerated by regeneration circuits 61*a* and 61*b*, respectively, and are applied to the phase modulator 13 after passing through attenuators 65*a* and 65*b*. Similarly, the drive signals Data 2 and X_Data 2 are regenerated by regeneration circuits 71*a* and 71*b*, respectively, and are applied to the phase modulator 14 after passing through attenuators 75*a* and 75*b*. In addition, attenuators 62*a*, 63 and 64 are provided between the drive signal generation unit 2 and the regeneration circuit 61*a*. Attenuators 62*b*, 63 and 64 are provided between the drive signal generation unit 2 and the regeneration circuit 61*b*. Attenuators 72*a*, 73 and 74 are provided between the drive signal generation unit 2 and the regeneration circuit 71*a*. Attenuators 72*b*, 73 and 74 are provided between the drive signal generation unit 2 and the regeneration circuit 71*b*.

The attenuators 65*a*, 62*b* and 73 are the same devices and each of which provides delay D1 (ATT1). The attenuators 65*b*, 62*a* and 74 are the same devices and each of which provides delay D2 (ATT2). The attenuators 75*a*, 72*b* and 63 are the same devices and each of which provides delay D3 (ATT3). The attenuators 75*b*, 72*a* and 64 are the same devices and each of which provides delay D4 (ATT4).

In this driver circuit, the respective amplitude of the drive signals Data 1, X_Data 1, Data 2 and X_Data 2 can be independently adjusted by appropriately selecting the respective amount of attenuation of the attenuators 65*a*, 65*b*, 75*a* and 75*b*. According to this configuration, not only the imbalance of the respective differential amplitude of the I arm and Q arm, but also the inbalance of the amplitude between a pair of drive signals constituting the differential signal can be suppressed. Therefore, the deterioration of a signal, due to the imbalance of the amplitude between drive signals can be prevented.

The drive signal Data 1 delays by D1 in the attenuator 65*a* and delays by D2+D3+D4 in the regeneration circuit 61*a*. The drive signal X_Data 1 delays by D2 in the attenuator 65*b* and delays by D1+D3+D4 in the regeneration circuit 61*b*. The drive signal Data2 delays by D3 in the attenuator 75*a* and delays by D4+D1+D2 in the regeneration circuit 71*a*. The drive signal X_Data 2 delays by D4 in the attenuator 75*b* and delays by D3+D1+D2 in the regeneration circuit 71*b*. Specifically, the delay time of each drive signal between the drive signal generation unit 2 and the corresponding phase modulator is D1+D2+D3+D4. Therefore, according to this configuration the skew between I/Q and the skew between differential signals does not occur.

Figure 17:
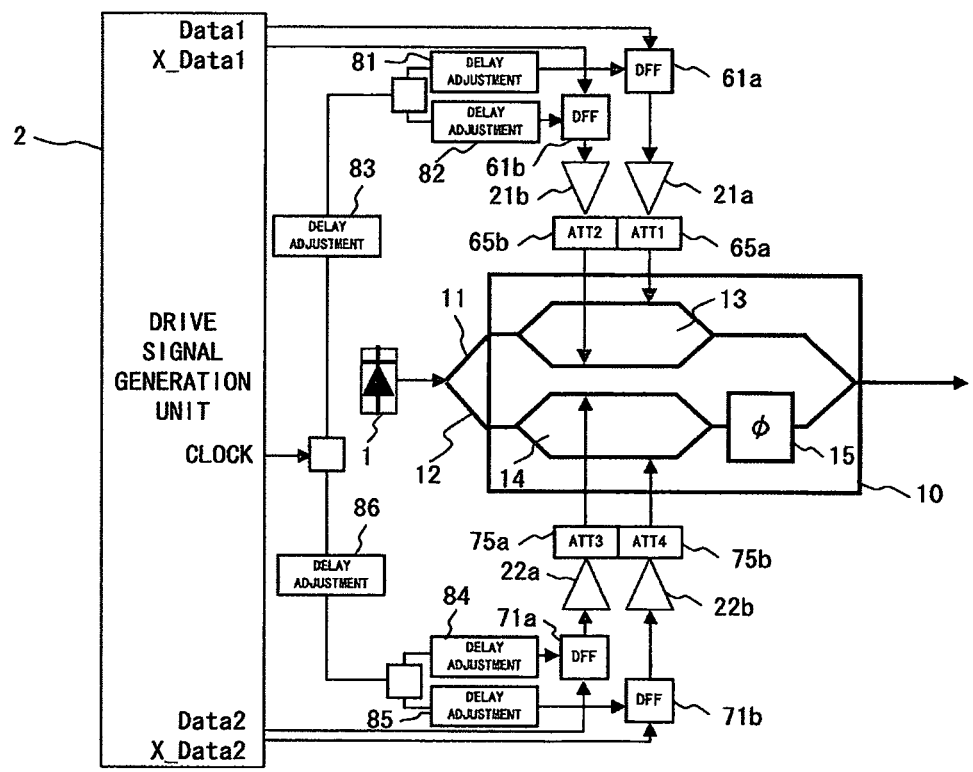
FIG. 17 shows a variation of the third embodiment.

FIG. 17 shows a variation of the third embodiment. The driver circuit shown in FIG. 17 comprises delay adjustment elements 81 and 82 instead of the attenuators 62a and 62b shown in FIG. 16, respectively. Delay adjustment elements 84 and 85 are provided in stead of the attenuators 72a and 72b, respectively. Furthermore, delay adjustment element 83 is provided instead of the attenuators 63 and 64, and delay adjustment element 86 is provided instead of the attenuators 73 and 74. Here, the delay adjustment elements 81, 82, 84 and 85 compensate for delays caused in the attenuators 65b, 65a, 75b and 75a, respectively. The delay adjustment element 83 compensates for the sum of delays caused in the attenuators 75a and 75b. Similarly, the delay adjustment element 86 compensates for the sum of delays caused in the attenuators 65a and 65b. Each delay adjustment element can be realized, for example, by a transmission line with corresponding delay time, as in the first and second embodiments. In this case each desired delay time can be obtained by adjusting the length of the transmission line.

<Adjustment of Driver Circuit>

Generally speaking it is not easy to mass-produce DQPSK optical modulators having the same operational characteristic. Therefore, in the embodiments of the present invention, the production variability among optical modulators is compensated for by appropriately adjusting the amplitude (and timing) of a drive signal. For this compensation, the constant of each element in the driver circuit is determined in accordance with the characteristic of each optical modulator at the time of initial setting.

Figure 18:
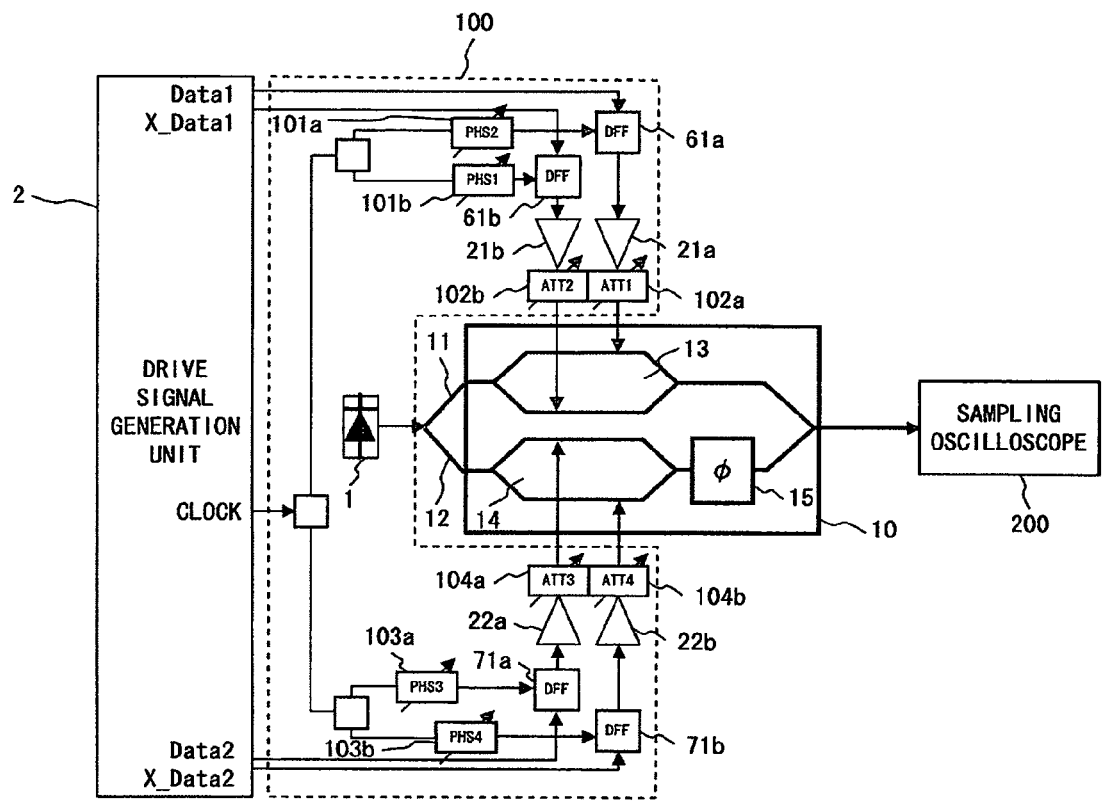
FIG. 18 shows the configuration of an adjustment system for determining the constant of each element on the driver circuit.

FIG. 18 shows the configuration of an adjustment system for determining the constant of each element in the driver circuit. In this case, the driver circuit of the second embodiment shown in FIG. 14 is adjusted.

An initial adjustment driver circuit 100 has the same circuit configuration as an actual driver circuit. Specifically, variable attenuators 102a, 102b, 104a and 104b correspond to the attenuators 43a, 43b, 51a and 51b, respectively, shown in FIG. 14. The amount of attenuation of each variable attenuator can be adjusted independently to a desired value. Variable phase shifters 101a and 101b correspond to the attenuator 52, and variable phase shifters 103a and 103b correspond to the attenuator 46. Each variable phase shifter is, for example, a variable length coaxial tube and can obtain a desired delay time. A sampling oscilloscope 200 monitors an optical signal outputted from the DQPSK optical modulator 10 and displays its waveform.

Figure 19:
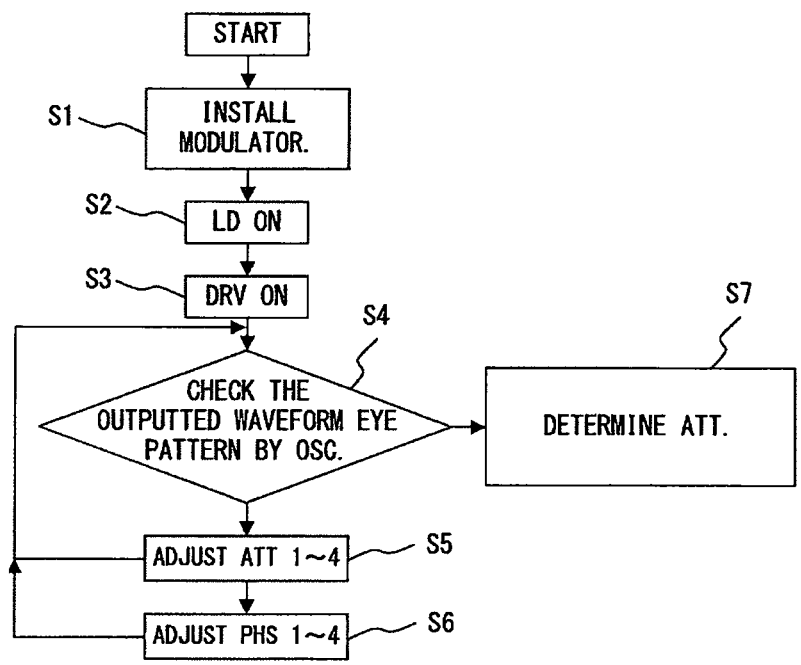
FIG. 19 is a flowchart showing the initial adjustment procedure for determining the constant of each element on the driver circuit.

FIG. 19 is a flowchart showing the initial adjustment procedure for determining the constant of each element of an driver circuit using the initial adjustment driver circuit 100.

In step S1 the DQPSK optical modulator is installed in the initial adjustment driver circuit 100. Specifically, the optical source 1 and the sampling oscilloscope 200 are connected to the input terminal and output terminal, respectively, of the DQPSK optical modulator. The variable attenuators 102a and 102b are connected to a pair of driver electrodes of the phase modulator 13, and the variable attenuators 104a and 104b are connected to a pair of driver electrodes of the phase modulator 14.

In step S2 the optical source 1 is switched on to start supplying CW light to the DQPSK optical modulator. In step S3 each of the driver elements 21a, 21b, 22a and 22b starts to drive. Thus, the DQPSK optical modulator outputs a DQPSK optical signal corresponding to the combination of the drive signals Data 1 and Data 2.

In steps S4 through S6 the waveform (eye pattern) of the DQPSK optical signal is checked while the respective amount of attenuation of the variable attenuators 102a, 102b, 104a and 104b and the respective amount of phase shift (that is, amount of delay) of the variable phase shifters 101a, 101b, 103a and 103b are being adjusted. The variable attenuators and the variable phase shifters are adjusted until a predetermined threshold characteristic of the waveform (for example, a prescribed distortion factor, a prescribed amount of jitter or the like) is obtained. Then, in step S7 the respective amount of attenuation of the variable attenuators 102a, 102b, 104a and 104b obtained when the threshold characteristic is satisfied is determined as the amount of attenuation of an actually used attenuator.

The attenuator with the amount of attenuation, which is determined as described above, is mounted on the actually used driver circuit. Thus, the DQPSK optical modulator can generate optical signals having higher quality than the threshold characteristic.

The adjustment in step S5 may be performed on the presumption that the respective amount of attenuation of the attenuators 102a and 102b are the same, and the respective amount of attenuation of the attenuators 104a and 104b are the same.

A measurement apparatus for monitoring the error rate of the DQPSK optical signal may be used instead of the sampling oscilloscope 200. In this case, the variable attenuators and the variable phase shifters are adjusted until the error rate of the DQPSK optical signal becomes lower than a predetermined threshold in step S4 through S6.

What is claimed is:

1. A driver circuit for driving a phase modulator to generate a phase modulated optical signal by combining a first optical signal obtained by a first phase modulation element and a second optical signal obtained by a second phase modulation element, using a first drive signal for driving the first phase modulation element and a second drive signal for driving the second phase modulation element, the driver circuit comprising:

a drive signal generator to generate the first drive signal, the second drive signal, and a clock signal;

a first regeneration circuit to regenerate the first drive signal using the clock signal;

an attenuator to attenuate the first drive signal regenerated by the first regeneration circuit;

a delay element to delay the clock signal; and a second regeneration circuit to regenerate the second drive signal using the clock signal delayed by the delay element, wherein a propagation time of the first drive signal from the drive signal generator to the first regeneration circuit is substantially the same as a propagation time of the second drive signal from the drive signal generator to the second regeneration circuit, a propagation time of the first drive signal from the first regeneration circuit to the first phase modulation element is longer by a delay time caused by the attenuator than a propagation time of the second drive signal from the second regeneration circuit to the second phase modulation element, a propagation time of the clock signal from the drive signal generator to the second regeneration circuit is longer by a delay time of the delay element than a propagation time of the clock signal from the drive signal generator to the first regeneration circuit, the delay time caused by the attenuator is substantially the same as the delay time of the delay element.

2. The driver circuit of a phase modulator according to claim 1, wherein
the delay element is an attenuator having the same characteristic as the attenuator.

3. The driver circuit of a phase modulator according to claim 1, wherein
the delay element is a transmission line with the same delay time as delay time caused by the attenuator.

4. A driver circuit for driving a phase modulator to generate a phase modulated optical signal by combining a first optical signal obtained by a first phase modulation element and a second optical signal obtained by a second phase modulation element, using a first drive signal for driving the first phase modulation element and a second drive signal for driving the second phase modulation element, the driver circuit comprising:
a drive signal generator to generate the first drive signal, the second drive signal, and a clock signal;
first and second delay elements to respectively delay a clock signal;
a first regeneration circuit to regenerate the first drive signal using the clock signal delayed by the first delay element;
a first attenuator to attenuate the first drive signal regenerated by the first regeneration circuit;
a second regeneration circuit to regenerate the second drive signal using the clock signal delayed by the second delay element; and
a second attenuator to attenuate the second drive signal regenerated by the second regeneration circuit, wherein
a propagation time of the first drive signal from the drive signal generator to the first regeneration circuit is substantially the same as a propagation time of the second drive signal from the drive signal generator to the second regeneration circuit,
delay time of the clock signal by the first delay element is substantially the same as a delay time of the second drive signal caused by the second attenuator, and
delay time of the clock signal by the second delay element is substantially the same as a delay time of the first drive signal caused by the first attenuator.

5. The driver circuit of a phase modulator according to claim 4, wherein
the first delay element is an attenuator having the same characteristic as the second attenuator, and
the second delay element is an attenuator having the same characteristic as the first attenuator.

6. The driver circuit of a phase modulator according to claim 4, wherein
the first delay element is a transmission line with the same delay time as delay time caused by the second attenuator, and
the second delay element is a transmission line with the same delay time as delay time caused by the first attenuator.

7. A driver circuit for driving a phase modulator to generate a phase modulated optical signal by combining a first optical signal obtained by a first phase modulation element and a second optical signal obtained by a second phase modulation element, using first and second drive signals of a differential signal for driving the first phase modulation element and third and fourth drive signals of a differential signal for driving the second phase modulation element, the driver circuit comprising:
first through fourth delay elements to respectively delay a clock signal;
first through fourth regeneration circuits to regenerate the first through fourth drive signals, respectively, using the clock signal delayed by corresponding first through fourth delay elements;
first through fourth attenuators to attenuate the first through fourth drive signals, regenerated by the first through fourth regeneration circuits, respectively;
a fifth delay element to delay the clock signal before the first and second delay elements; and
a sixth delay element to delay the clock signal before the third and fourth delay elements, wherein
delay time of the clock signal by the first delay element compensates for a delay of the second drive signal caused in the second attenuator,
delay time of the clock signal by the second delay element compensates for a delay of the first drive signal caused in the first attenuator,
delay time of the clock signal by the third delay element compensates for a delay of the fourth drive signal caused in the fourth attenuator,
delay time of the clock signal by the fourth delay element compensates for a delay of the third drive signal caused in the third attenuator,
delay time of the clock signal by the fifth delay element compensates for a sum of a delay of the third drive signal caused in the third attenuator and a delay of the clock signal by the third delay element, and
delay time of the clock signal by the sixth delay element compensates for a sum of a delay of the first drive signal caused in the first attenuator and a delay of the clock signal by the first delay element.

8. The driver circuit of a phase modulator according to claim 7, wherein
the first delay element is an attenuator having the same characteristic as the second attenuator,
the second delay element is an attenuator having the same characteristic as the first attenuator,
the third delay element is an attenuator having the same characteristic as the fourth attenuator,
the fourth delay element is an attenuator having the same characteristic as the third attenuator,
the fifth delay element is a series circuit of an attenuator having the same characteristic as the third attenuator and an attenuator having the same characteristic as the fourth attenuator, and
the sixth delay element is a series circuit of an attenuator having the same characteristic as the first attenuator and an attenuator having the same characteristic as the second attenuator.

\* \* \* \* \*